United States Patent
Treffot

(10) Patent No.: US 10,811,199 B2
(45) Date of Patent: Oct. 20, 2020

(54) ACTUATION SYSTEM FOR AN ELECTRICAL SWITCHING DEVICE

(71) Applicant: Schneider Electric Industries SAS, Rueil-Malmaison (FR)

(72) Inventor: Dominique Treffot, Grenoble (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 16/587,109

(22) Filed: Sep. 30, 2019

(65) Prior Publication Data

US 2020/0111623 A1  Apr. 9, 2020

(30) Foreign Application Priority Data

Oct. 3, 2018  (FR) ..................... 18 59165

(51) Int. Cl.
*H01H 5/14* (2006.01)
*H01H 3/30* (2006.01)
*H01H 3/04* (2006.01)
*H01H 3/38* (2006.01)
(Continued)

(52) U.S. Cl.
CPC ............ *H01H 3/3031* (2013.01); *H01H 3/04* (2013.01); *H01H 3/3005* (2013.01); *H01H 3/3042* (2013.01); *H01H 3/38* (2013.01); *H01H 5/14* (2013.01); *H01H 71/10* (2013.01); *H01H 71/1009* (2013.01); *H01H 2001/223* (2013.01)

(58) Field of Classification Search
CPC .. H01H 3/3031; H01H 3/3005; H01H 3/3026; H01H 3/3042; H01H 2003/3036; H01H 3/38; H01H 5/04; H01H 5/14; H01H 2001/223; H01H 71/1009; H01H 71/10
See application file for complete search history.

(56) References Cited

U.S. PATENT DOCUMENTS 3,577,877 A   5/1971  Warne
5,030,804 A * 7/1991  Abri ..................... H01H 1/2041
                                                          200/244

(Continued)

FOREIGN PATENT DOCUMENTS

FR   1 586 097 A    2/1970
FR   2 985 600 A1   7/2013

OTHER PUBLICATIONS

French Preliminary Search Report dated Jun. 18, 2019 in French Application 18 59165 filed on Oct. 3, 2018 (with English Translation of Categories of Cited Documents & Written Opinion).

*Primary Examiner* — Felix O Figueroa
(74) *Attorney, Agent, or Firm* — Oblon, McClelland, Maier & Neustadt, L.L.P.

(57) ABSTRACT

A locking module of an arming system including accumulation device, the module including a lever, second end including a bearing surface, the accumulation device exerting a thrust force on the first end when it is in the armed state; a lock element intended to adopt a first position to oppose the thrust force and a second position to stop opposing the thrust force; the module being characterized in that a shoe fixed to the lever is interposed between the bearing surface and the contact surface when the bearing surface is bearing against the contact surface, the width of the surface of the shoe in contact with the contact surface being greater than the width of the bearing surface.

14 Claims, 8 Drawing Sheets

(51) Int. Cl.
*H01H 71/10* (2006.01)
*H01H 1/22* (2006.01)

(56) References Cited

U.S. PATENT DOCUMENTS

| | | | | |
|---|---|---|---|---|
| 6,809,279 | B2 * | 10/2004 | Allmen | H01H 3/3005 |
| | | | | 200/501 |
| 7,880,105 | B2 * | 2/2011 | Hashimoto | H01H 3/30 |
| | | | | 200/17 R |
| 9,373,457 | B2 * | 6/2016 | Roelandt | H01H 3/3015 |
| 2010/0078300 | A1 * | 4/2010 | Freundt | H01H 3/30 |
| | | | | 200/337 |
| 2014/0299455 | A1 | 10/2014 | Roelandt et al. | |

* cited by examiner

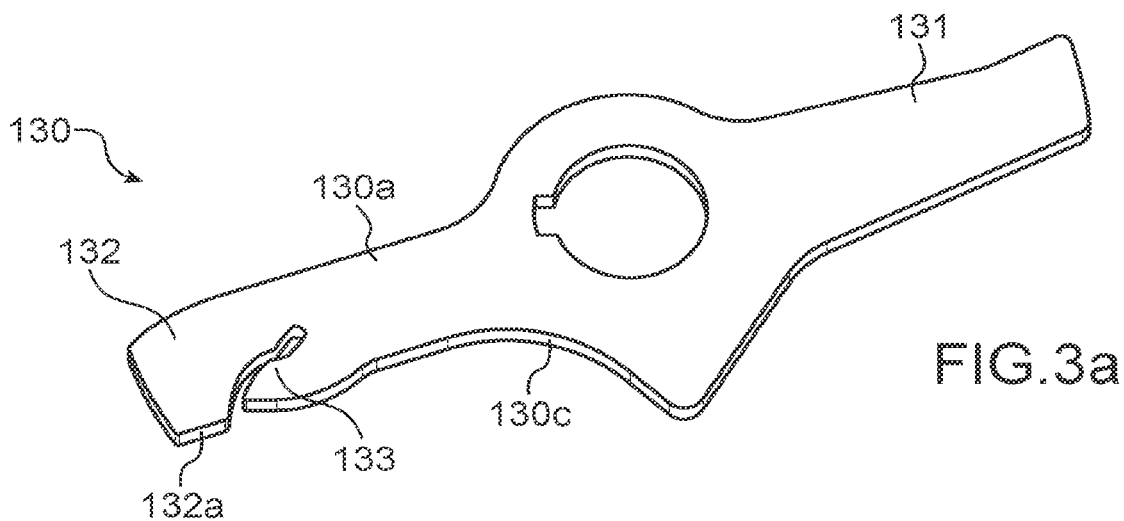
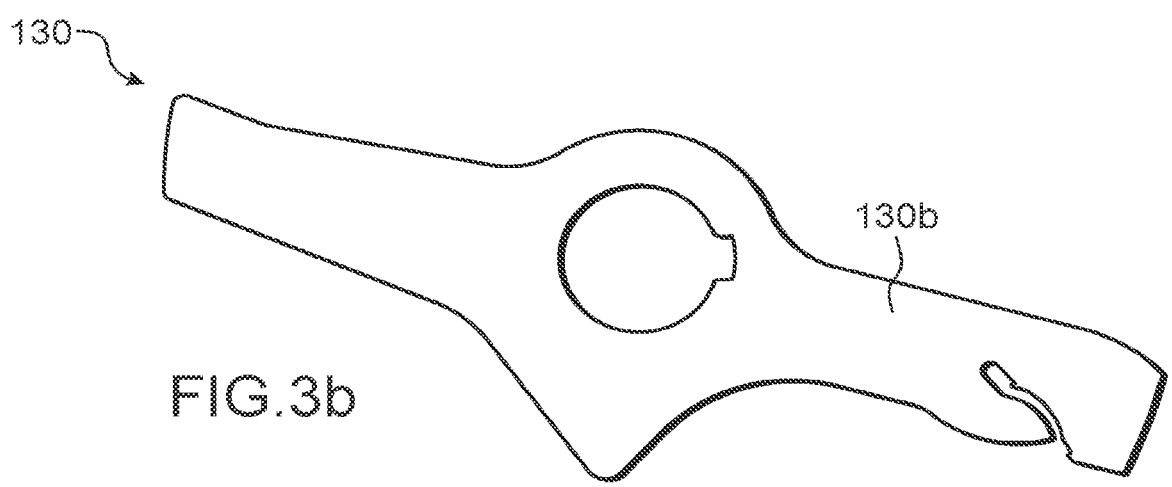
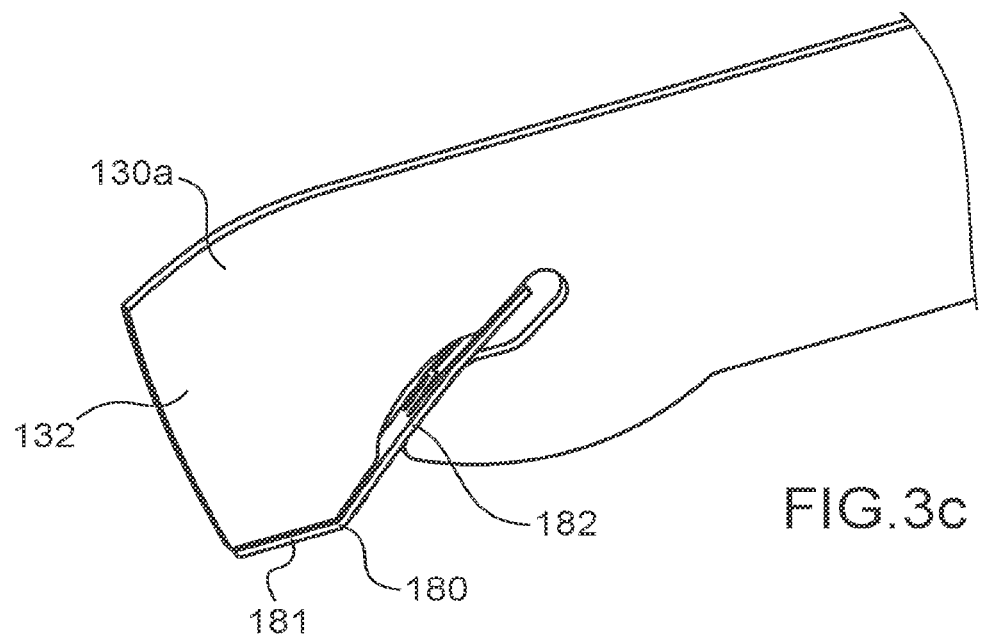

ACTUATION SYSTEM FOR AN ELECTRICAL SWITCHING DEVICE

TECHNICAL FIELD

The present invention relates to a locking module of an arming system for an electrical switch device, and in particular an arming system of a current making and breaking module. The invention relates also to a control system of a current making and breaking module provided with the locking module according to the present invention.

STATE OF THE PRIOR ART

A locking module of an arming system can be implemented for the manoeuvring, and in particular the closing and/or the opening, of a current making and breaking module in an electrical switch device, in particular an electrical switch device operating at medium voltage or high voltage, that is to say operating with a voltage greater than 1000 V.

Hereinafter in the description, the current making and breaking module will be called current breaking module, it being understood that the latter is equally likely to be implemented for the making as for the breaking of current.

In the present document, the term electrical switch device encompasses, without distinction, several types of electrical devices such as a switch, a circuit breaker, a contactor, a fuse-switch, a disconnecting switch, a recloser, etc.

The arming system is in this respect provided with an accumulation means intended to release a mechanical energy during the switch from an armed state to a disarmed state.

The locking module also comprises:
- a lever pivot-linked around a first pivot shaft, and which comprises a first end and a second end, the second end comprising a surface, called bearing surface, the accumulation means exerting a thrust force on the first end when it is in the armed state;
- a lock element intended to adopt one or other of two positions called, respectively, first position and second position, the first position corresponding to a position for which the bearing surface is bearing against a contact surface of the lock element so as to oppose any rotation of the lever due to the thrust force and keep the accumulation means in the armed state, the second position corresponding to a retraction of the contact surface so as to allow the accumulation means to switch from the armed state to the disarmed state.

The lock element of this locking module can comprise a half-moon pivot-linked around a second pivot axis.

"Half-moon" is understood to mean a cylinder truncated along a cutting plane parallel to the axis of revolution of said cylinder. A particular example of a half-moon is a half-cylinder. The remaining cylindrical surface of the half-moon defines the contact surface.

The accumulation means can comprise a spring, for example a compression spring or a spiral spring, which, when it is placed under compression or under tension, is in the armed state.

This locking module known from the state of the art is however unsatisfactory and can be refined both technically and economically.

Indeed, in order to allow the switching of the lock element from its first position to its second position with a reasonable force, the coefficient of friction between the contact surface and the bearing surface must be as low as possible.

To this end, the bearing surface of the lever is generally prepared so as to exhibit a relatively low roughness, in particular lower than 1.6 µm (Ra), for example between 0.6 µm and 1.6 µm.

Such a surface preparation is generally obtained with resurfacing equipment that is relatively costly and complicated to implement.

Moreover, the lever ordinarily comprises a metal plate that is relatively thick, notably greater than 6 mm, so as to give it a transverse contact surface that is wide enough to avoid in particular a burring and therefore a deformation of the half-moon. The manufacturing of the lever is therefore generally executed by a metal block machining method which is costly and complicated to implement.

One aim of the present invention is then to propose a locking module for which the adjustment of the coefficient of friction between the bearing surface and the contact surface is simpler to implement and less expensive.

Another aim of the present invention is also to propose a locking module for which the lever is simpler to manufacture and less expensive.

SUMMARY OF THE INVENTION

The aims of the present invention are, at least partly, achieved through a locking module of an arming system provided with an accumulation means intended to release a mechanical energy during the switch from an armed state to a disarmed state, the module comprising:
- a lever pivot-linked around a first pivot shaft, and which comprises a first end and a second end, the second end comprising a surface, called bearing surface, which has a width, called bearing width, the accumulation means exerting a thrust force on the first end when it is in the armed state;
- a lock element configured to adopt one or other of two positions called, respectively, first position and second position, the first position corresponding to a position for which the bearing surface is bearing against a contact surface of the lock element so as to oppose any rotation of the lever due to the thrust force and keep the accumulation means in the armed state, the second position corresponding to a retraction of the contact surface so as to allow the accumulation means to switch from the armed state to the disarmed state;
- the module being characterized in that a shoe, made of a metal leaf and fixed to the lever, is interposed between the bearing surface and the contact surface when the bearing surface is bearing against the contact surface, a shoe surface portion, called secondary surface, being in contact with the contact surface, said secondary surface having a width, called shoe width, greater than the bearing width.

According to one implementation, the shoe width is at least two times greater than the bearing width.

According to one implementation, the secondary surface has a roughness less than 1.6 µm Ra.

According to one implementation, the shoe also comprises a securing tongue which is engaged in a slit formed in the lever so as to secure the shoe to said lever.

According to one implementation, the lever comprises a hub overmoulded in plastic material ensuring the pivot link of said lever with the first pivot shaft, advantageously the hub comprises a bore, passed through by the first pivot shaft, and extending over a length of at least three times the diameter of the pivot shaft.

According to one implementation, the lever comprises a metal plate of a thickness less than 6 mm, advantageously between 2 mm and 6 mm.

According to one implementation, the lock element is a half-moon pivot-linked around a second pivot shaft, advantageously essentially parallel to the first pivot shaft, the contact surface being defined by a section of the surface with cylindrical geometry of the half-moon.

According to one implementation, the arming system comprises a plate mechanically coupled to the accumulation means and bearing a roller intended to apply the thrust force on the first end.

According to one implementation, the accumulation means comprises a spiral spring provided with a peripheral end and a central end mechanically linked to an arming shaft, advantageously via a groove formed in said arming shaft.

According to one implementation, the arming system is an opening mechanism of a current breaking device.

According to one implementation, the arming system is a closing mechanism of a current breaking device, the peripheral end being linked mechanically to a wheel, which is in turn pivot-linked around the arming shaft.

According to one implementation, the arming system is an opening mechanism of a current breaking device, the peripheral end being held fixed, the wheel being fixedly linked with the arming shaft.

The invention relates also to a control module of the current breaking device which comprises a module provided with an arming system for opening the current breaking device and/or a module provided with an arming system for closing the current breaking device.

The invention relates also to a control module of the current breaking device which comprises a module provided with an arming system for opening the current breaking device and a module provided with an arming system for closing the current breaking device, the two arming systems having a common arming shaft.

The invention relates also to an electrical switch device comprising a module according to the present invention.

BRIEF DESCRIPTION OF THE DRAWINGS

Other features and advantages will emerge from the following description of the locking module of an arming system according to the invention, given as nonlimiting examples, with reference to the attached drawings in which:

FIGS. 3a and 3b are schematic representations of the lever of FIG. 1, respectively, the first face and the second face;

FIG. 3c is a schematic representation of the shoe arranged at the second end of the lever of FIG. 1;

DETAILED DESCRIPTION OF PARTICULAR EMBODIMENTS

Figure 1:
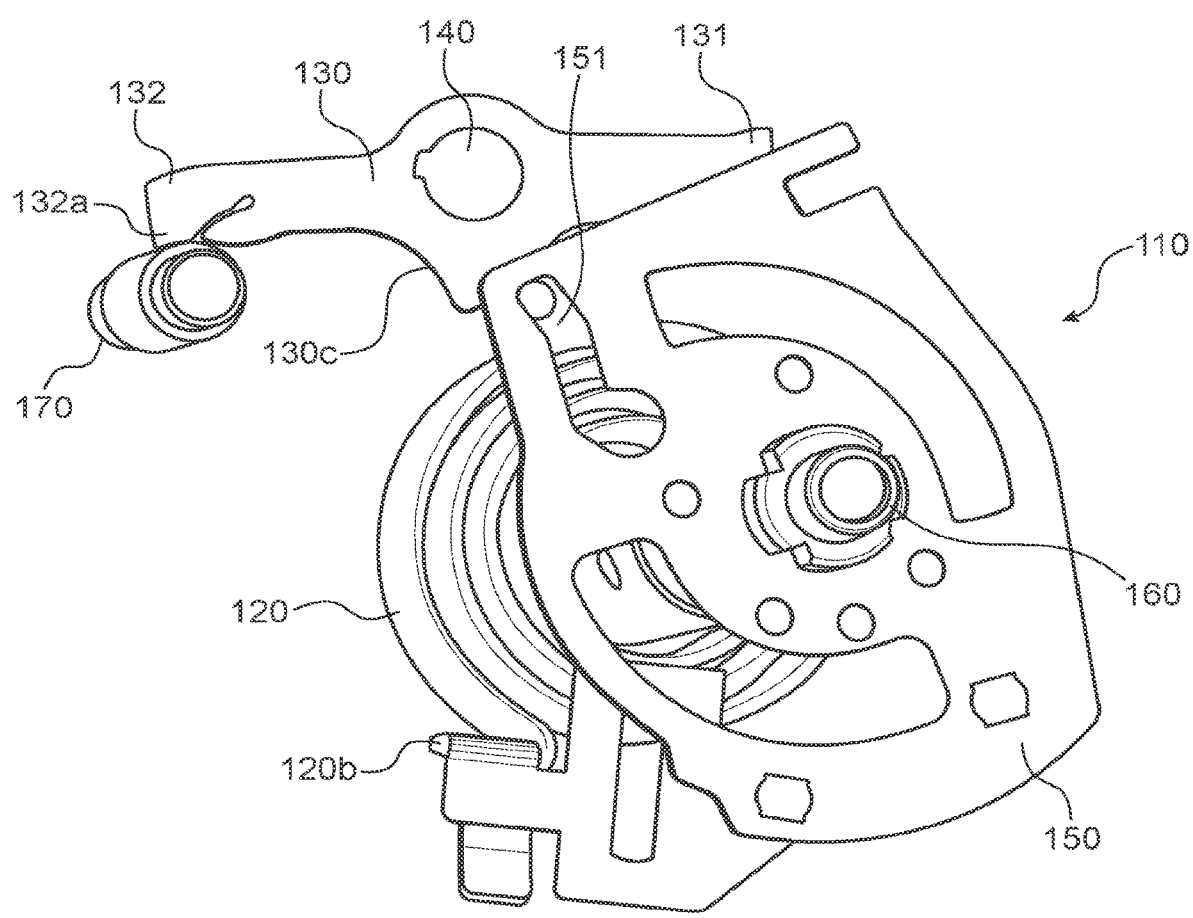
FIG. 1 is a schematic representation of a first example of locking module according to the present invention.
Figure 2:
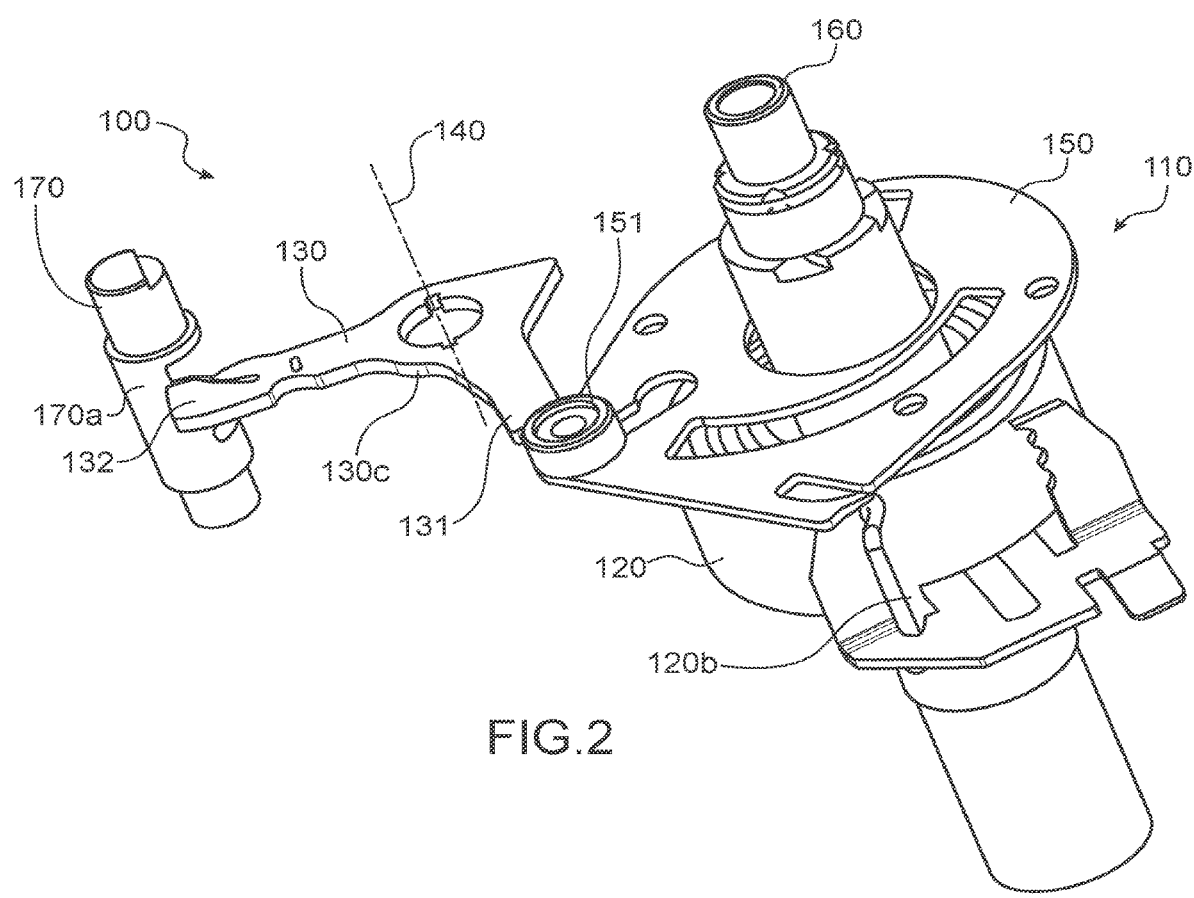
FIG. 2 is a schematic representation of a second example of locking module according to the present invention.
Figure 3D:
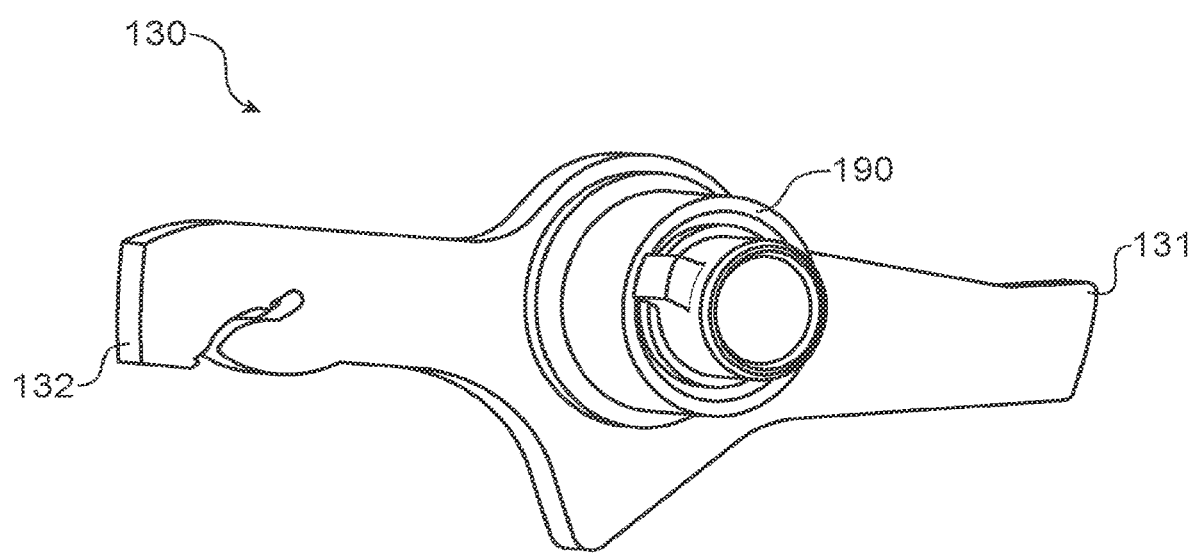
FIG. 3d is a schematic representation of the lever of FIG. 1 provided with a hub.

FIGS. 1 and 2 are schematic representations of a first example and of a second example of a locking module 100 according to the present invention.

A locking module, as represented in these figures, is generally implemented to control the opening (FIG. 1) and/or the closing (FIG. 2) of a current breaking device, and in particular a switch.

In this respect, an opening control and a closing control generally comprise the action of an arming system 110 provided with a mechanical energy accumulation means 120.

The energy accumulation means 120 can in particular comprise a spring, and in particular a compression spring or a spiral spring (it is understood that a spiral spring within the meaning of the present invention is a flat spring with non-contiguous turns, for example wound around a shaft).

The accumulation means 120 can adopt one or other of two states called, respectively, armed state and disarmed state, and is suitable for releasing a mechanical energy when it switches from the armed state to the disarmed state. In this respect, the armed state results from an arming (or arming phase) of the accumulation means 120.

The locking module 100 comprises a lever 130 (FIGS. 1, 2, 3a, 3b, 4a, 4b) pivot-linked around a first pivot shaft 140.

The lever 130 comprises a first end 131 and a second end 132 (also called "hook"), the second end comprises a surface called bearing surface 132a (see FIG. 1) which has a width, called bearing width.

It is understood, without it being necessary to specify it, that a width, whatever the element considered, is measured in a direction parallel to the pivot shaft.

The lever 130 comprises two lateral faces called, respectively, first face 130a and second face 130b linked by an outline 130c (the distance between the first face 130a and the second face 130b defines the thickness E of the lever 130). It is understood without it being necessary to specify it that the two lateral faces of the lever are at right angles to the first pivot shaft 140.

It is also understood, without it being necessary to specify it, that the bearing face 132a is a small part of the outline 130c at the second end 132.

According to the present invention, the accumulation means 120 exerts a thrust force on the first end 131 when it is in the armed state.

In other words, when it offers no resistance to the thrust force exerted by the accumulation means in the armed state, the lever 130 pivots around the first pivot shaft 140. This rotational movement of the lever 130 therefore allows, simultaneously, the release of the mechanical energy stored by the accumulation means 120, and the switching thereof from the armed state to the disarmed state.

The arming system can comprise a wheel 150 mechanically coupled to the accumulation means, and bearing a roller, called stop roller 151, intended to apply the thrust force on the first end 131 (FIGS. 1 and 2).

Figure 5:
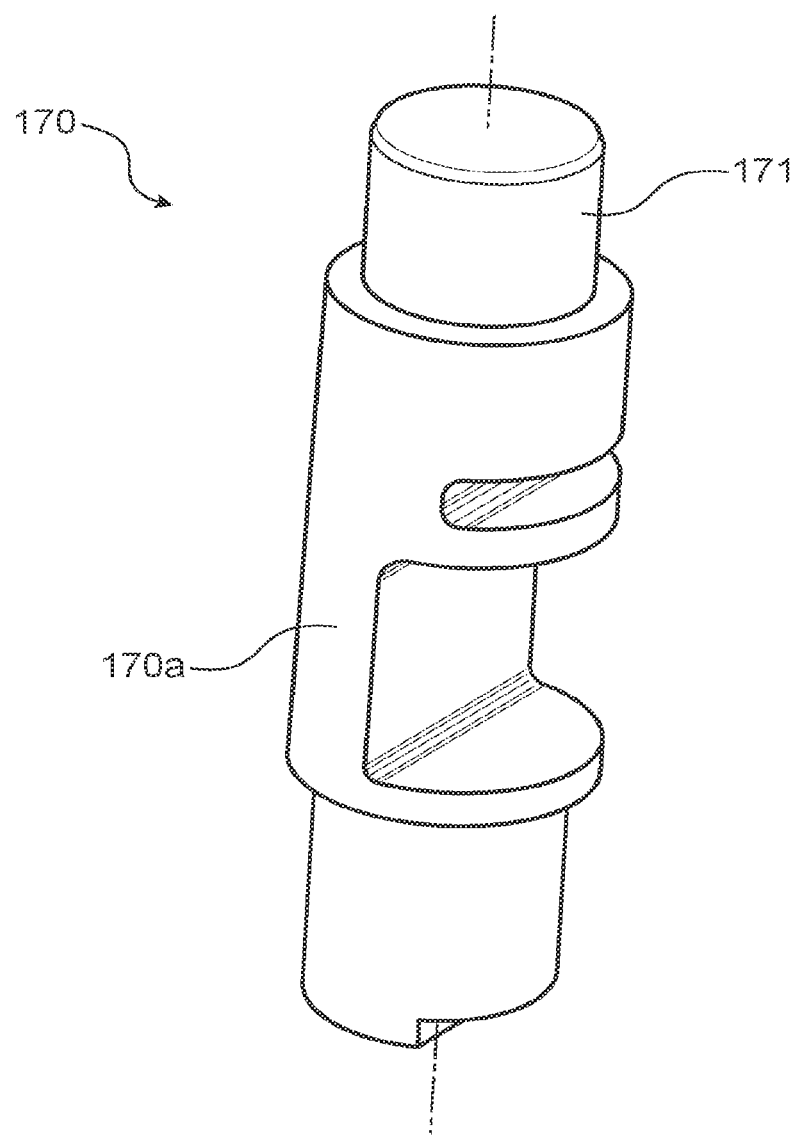
FIG. 5 is a perspective schematic representation of a half-moon.

The locking module also comprises a lock element 170 (FIGS. 1, 2 and 5) intended to adopt one or other of two positions called, respectively, first position and second position.

In particular, the first position corresponds to a position for which the bearing surface 132a is bearing against a contact surface 170a (FIGS. 2 and 5) of the lock element 170 so as to oppose any rotation of the lever 130 due to the thrust force and keep the accumulation means 120 in the armed state.

The second position corresponds to a retraction of the contact surface 170a so as to allow the accumulation means 120 to switch from the armed state to the disarmed state.

"Retraction of the contact surface" is understood to mean a slip of said surface so that the latter is cancelled out and no longer offers resistance to the thrust force exerted by the accumulation means 120 at the second end 132 of the lever 130.

Figure 4A:
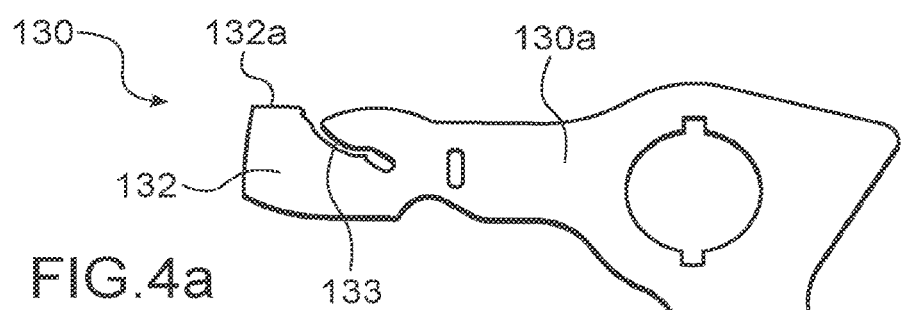
FIGS. 4a and 4b are schematic representations of the lever of FIG. 2, respectively, the first face and the second face.
Figure 4B:
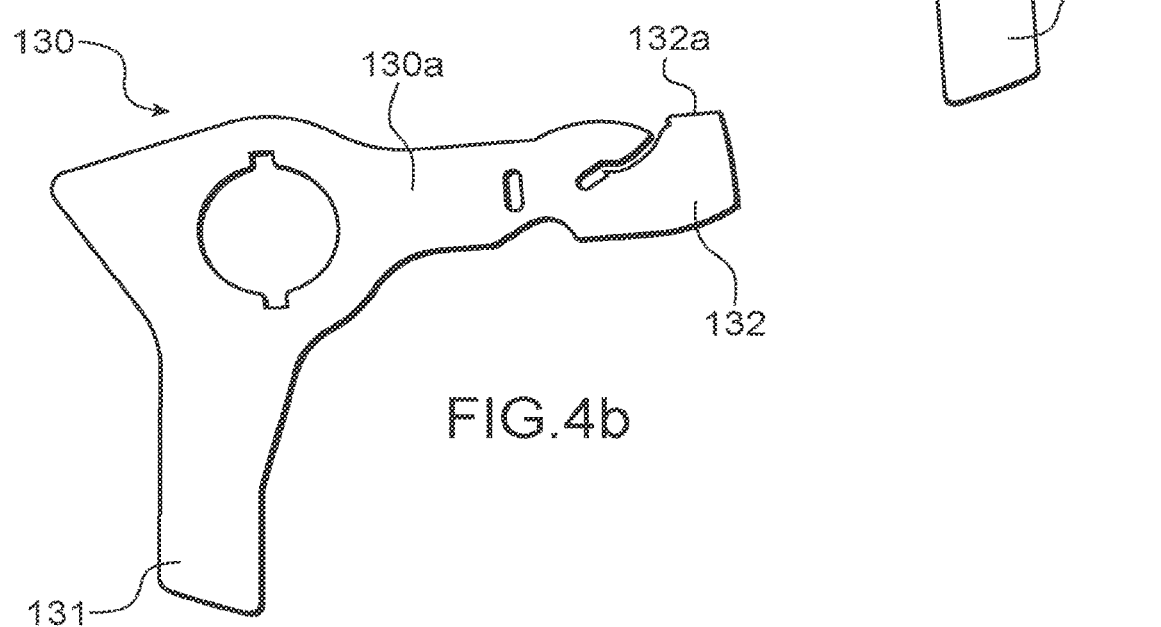
Figure 4C:
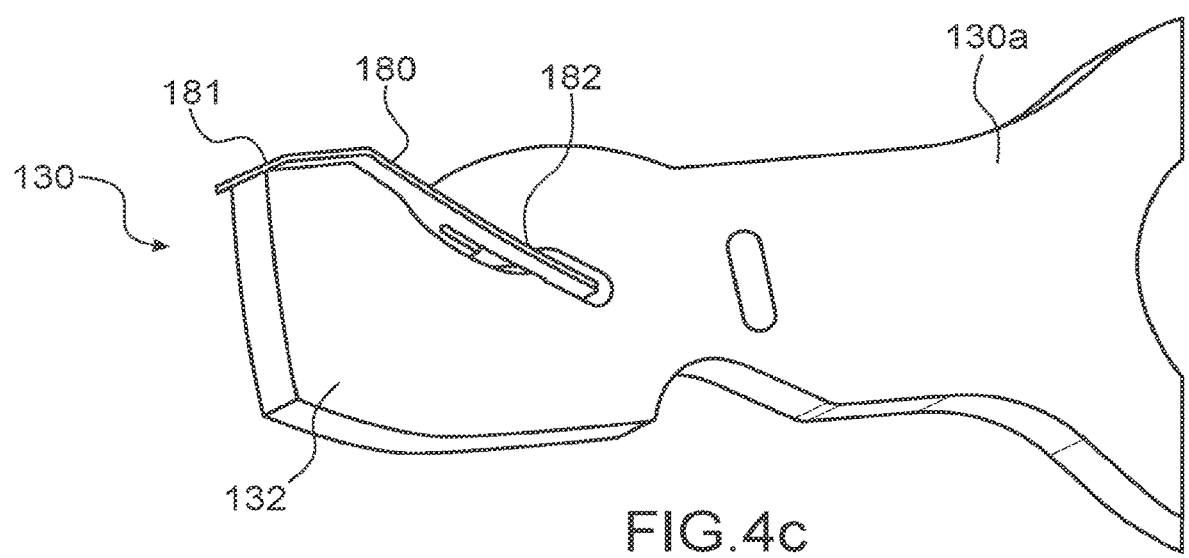
FIG. 4c is a schematic representation of the shoe at the second end of the lever of FIG. 2.

According to the present invention, the lever 130 comprises, at its second end, a shoe 180 made of a metal leaf (FIGS. 3c and 4c).

The shoe is in particular arranged so as to be interposed between the contact surface 170a and the bearing surface 132a.

In particular, a surface portion of the shoe, called secondary surface 181, of a width called shoe width, is in contact with the contact surface 170a (see FIGS. 3c and 4c), when said bearing surface is bearing against the contact surface.

The shoe is advantageously arranged symmetrically relative to the lever 130.

The implementation of such a shoe 180 thus avoids the contact between the contact surface 170a and the bearing surface 132a so that the latter no longer requires preparation, and in particular resurfacing.

Moreover, a metal leaf is generally formed from a rolled metal sheet so that the latter has a surface condition, and in particular a roughness, compatible with a reduced friction coefficient. The metal leaf can comprise stainless steel.

Thus, the secondary surface exhibits a roughness less than 1.6 μm Ra ("Ra" denoting the arithmetical roughness), in particular a roughness of between 0.6 μm Ra and 1.6 μm Ra.

Should it prove necessary, the preparation of the secondary surface, in particular to reduce its roughness, can be obtained by polishing techniques that are simpler to implement, and less expensive than the resurfacing methods used to resurface a surface portion of a machined part.

Particularly advantageously, the shoe width is greater than the bearing width, and in particular equal to at least two times the bearing width.

The shoe 180 can comprise a securing tongue 182 which is engaged in a slit, called securing slit 133, formed in the lever so as to secure the shoe to said lever (FIGS. 3c and 4c).

The fitting of the securing tongue 182 in the securing slit 133 (FIGS. 3a and 4a) can be a force-fitting.

Complementarily or alternatively, the securing slit 133 can be provided with a blocking element, in particular at least one lug, for the securing tongue 133.

The lug can cooperate with a drill-hole formed in the securing tongue 182.

However, this method of securing the shoe 180 is not limited to the implementation of the securing tongue, and a person skilled in the art will be able to consider any other securing solution that may be appropriate.

In particular, the shoe 180 can be secured at the second end of the lever by gluing or by welding.

Figure 4D:
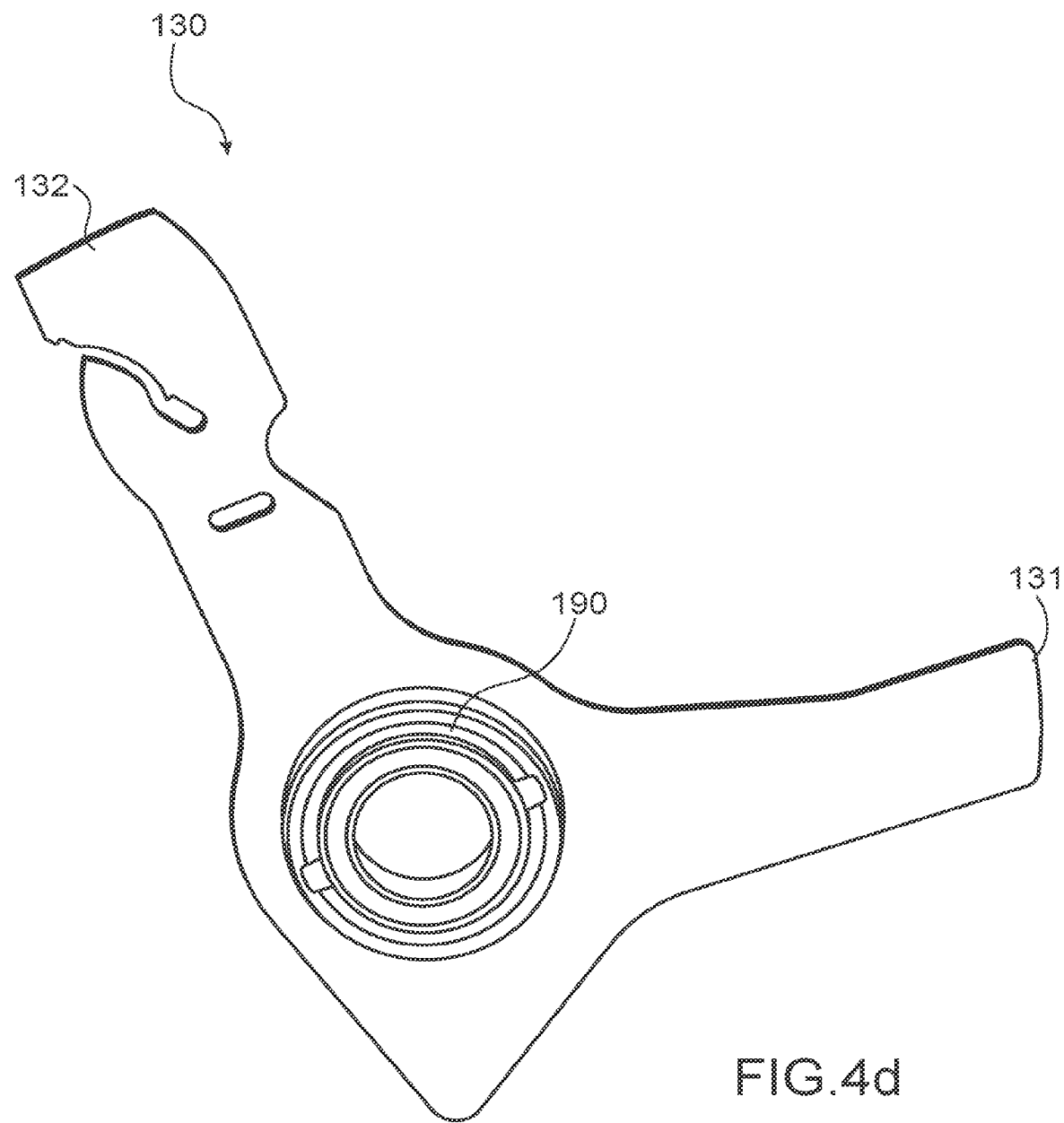
FIG. 4d is a schematic representation of the lever of FIG. 2 provided with a hub.

Still advantageously, the lever 130 comprises a hub 190 (FIGS. 3d and 4d) overmoulded in plastic material ensuring the pivot link of said lever 130 with the first pivot shaft, advantageously the hub comprises a bore, passed through by the first pivot link, and extending over a length of at least three times the diameter of the pivot shaft.

This arrangement, in combination with a shoe width greater than the bearing width, makes it possible to consider a lever of reduced thickness, in particular of a thickness less than 6 mm, and more particularly of between 2 mm and 6 mm.

A lever in this range of thicknesses can be obtained by stamping or cutting a metal sheet (for example of stainless steel).

This type of method is relatively simple to implement, and less expensive compared to the machining techniques considered in the state of the art.

The lock element 170 can comprise a half-moon (FIGS. 1, 2 and 5) pivot-linked around a second pivot shaft 171. The second pivot shaft 171 is, advantageously, essentially parallel to the first pivot shaft 140, the contact surface being defined by a section of the surface with cylindrical geometry of said half-moon.

A half-moon, according to the present invention, is a cylinder truncated along a plane parallel to the axis of revolution of said cylinder. The half-moon then comprises a remaining cylindrical surface of which two edges are linked by a planar face. The remaining cylindrical section of the half-moon comprises the contact surface of the lock element.

In operation, the half-moon can pivot around the second pivot shaft to adopt one or other of the first position and the second position.

In particular, in the arming phase of the accumulation means 120, the half-moon is in its first position so that, when said accumulation means exerts the thrust force, the bearing surface 132a comes to bear against the contact surface of the half-moon. Thus, during this arming phase, the accumulation means accumulates a mechanical energy, and is in the armed state.

A switchover, or a pivoting of the half-moon, from its first position to its second position, breaks any resistance to the thrust force exerted by the accumulation means 120 so that the latter releases the mechanical energy accumulated in the arming phase, and is ultimately back in the disarmed state.

As nonlimiting examples, FIGS. 1 and 2 illustrate relative particular arrangements of the present invention.

In particular, FIGS. 1 and 2 illustrate a locking module of an arming system provided, respectively, for the opening and for the closing of a current interrupting device, and in particular a switch.

Figure 6:
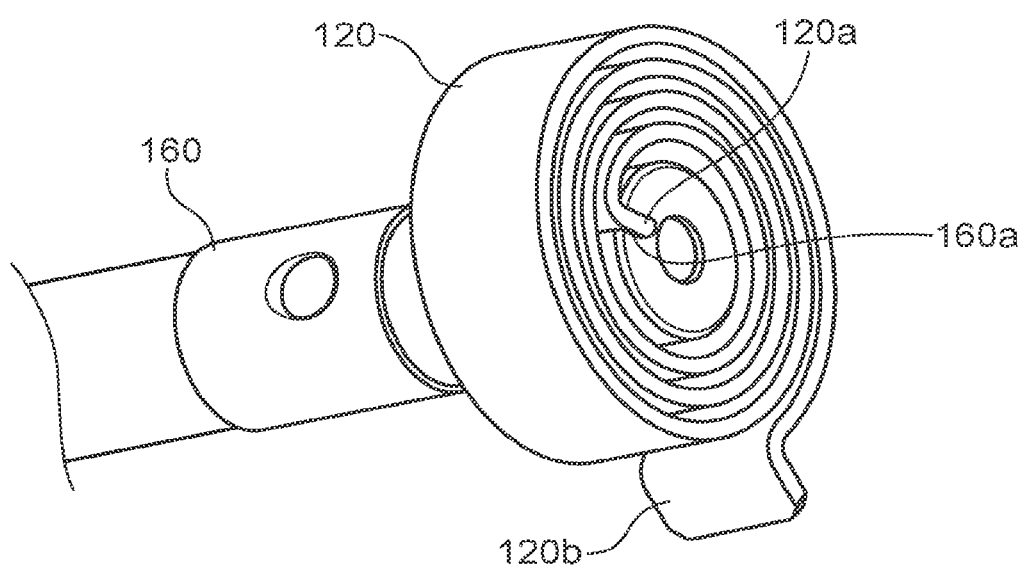
FIG. 6 is a schematic representation of a flat spiral spring with non-contiguous turns linked to the arming shaft via a groove.

In particular, the accumulation means 120 comprises a spiral spring of which one end, called central end 120a (FIG. 6) is mechanically linked to a shaft, called arming shaft 160. The arming shaft 160 can advantageously be essentially parallel to the first pivot shaft 140.

The mechanical link between the arming shaft 160 and the central end 120a is advantageously ensured via a groove 160a formed in said arming shaft 160.

The other end of the spiral spring, called peripheral end 120b (FIG. 6), can be fixed, and in particular mechanically coupled to a fixed element not represented in the figures (for example, a fixed element linked to the frame of the device, FIG. 1).

In this particular case, the wheel 150 is fixedly linked relative to the arming shaft 160 (FIG. 1).

Thus, the spiral spring, when it is in the armed state, exerts a force on the arming shaft 160, capable of rotationally driving the latter with the wheel 150. The wheel 150 then transmits the thrust force, via the stop roller 151, at the first end 132 of the lever 130.

Alternatively, the peripheral end 120b can be fixedly linked relative to the wheel 150 (FIG. 2).

According to this configuration, the wheel 150 is then pivot-linked around the arming shaft 160 (FIG. 2).

The arming of the spiral spring is obtained by exerting a rotational force on the arming shaft 160.

The stop roller 151 can be mounted with runner link on the wheel 150.

The arming phase of the spiral spring then comprises two intermediate phases called, respectively, first phase and second phase.

The first phase then corresponds to a rotation, about the axis of rotation of the arming shaft 160, of the assembly formed by the spiral spring, the wheel 150 and the stop roller 151. In this first phase, the stop roller 151 slips along the outline 130c of the lever 130 to reach the first end 131 of said lever 130.

When the stop roller 151 has reached the first end, the second phase can begin. While this second phase proceeds, the bearing surface 132a is bearing against the contact surface 170a (it is understood that the shoe is inserted between the bearing surface and the contact surface), so that the spiral spring accumulates mechanical energy under the rotational action exerted on the arming shaft.

At the end of the second phase, the spiral spring is in the armed state. At this instant, an simple switchover of the half-moon to its second position breaks any resistance to the thrust force so that the spiral spring releases all the mechanical energy accumulated in the arming phase and switches to the disarmed state. The invention relates also to a control module of the current breaking device. In particular, the control module can comprise an arming system for the opening of a current breaking device and/or an arming system for the closing of the current breaking device.

Moreover, when the arming system for the opening and the arming system for the closing are included in a common control module, they can comprise a common arming shaft.

The invention relates also to an electrical switch device comprising a module according to the present invention.

The invention claimed is:

1. A locking module of an arming system provided with an accumulation means configured to release a mechanical energy during the switch from an armed state to a disarmed state, the module comprising:
    a lever pivot-linked around a first pivot shaft, and which comprises a first end and a second end, the second end comprising a surface, called bearing surface, which has a width, called bearing width, the accumulation means exerting a thrust force on the first end when the accumulation means is in the armed state;
    a lock element configured to adopt one or other of two positions called, respectively, first position and second position, the first position corresponding to a position for which the bearing surface is bearing against a contact surface of the lock element so as to oppose any rotation of the lever due to the thrust force and keep the accumulation means in the armed state, the second position corresponding to a retraction of the contact surface so as to allow the accumulation means to switch from the armed state to the disarmed state;
    wherein a shoe, made of a metal leaf and fixed to the lever, is interposed between the bearing surface and the contact surface when the bearing surface is bearing against the contact surface, a shoe surface portion, called secondary surface, being in contact with the contact surface, said secondary surface having a width, called shoe width, greater than the bearing width.

2. The module according to claim 1, wherein the shoe width is at least two times greater than the bearing width.

3. The module according to claim 1, wherein the secondary surface has a roughness less than 1.6 μm Ra.

4. The module according to claim 1, wherein the shoe also comprises a holding tongue which is engaged in a slit formed in the lever so as to secure the shoe to said lever.

5. The module according to claim 1, wherein the lever comprises a hub overmoulded with plastic material ensuring a pivot link of said lever with the first pivot shaft, wherein the hub comprises a bore, passed through by the first pivot shaft, and extending over a length of at least three times the diameter of the pivot shaft.

6. The module according to claim 5, wherein the lever comprises a metal plate of a thickness between 2 mm and 6 mm.

7. The module according to claim 1, wherein the lock element is a half-moon pivot-linked around a second pivot shaft, essentially parallel to the first pivot shaft, the contact surface being defined by a section of the surface with cylindrical geometry of the half-moon.

8. The module according to claim 1, wherein the arming system comprises a wheel mechanically coupled to the accumulation means and bearing a stop roller intended to apply the thrust force on the first end.

9. The module according to claim 8, wherein the accumulation means comprises a spiral spring provided with a peripheral end and a central end mechanically linked to an arming shaft, via a groove formed in said arming shaft.

10. The module according to claim 9, wherein the arming system is a closing mechanism of a current breaking device, the peripheral end being linked mechanically to the wheel which is in turn pivot-linked around the arming shaft.

11. The module according to claim 9, wherein the arming system is an opening mechanism of a current breaking device, the peripheral end being held fixed, the wheel being fixedly linked with the arming shaft.

12. A control module of the current breaking device which comprises a module according to claim 10.

13. A control module of the current breaking device which comprises a module according to claim 10, an opening mechanism and the closing mechanism having a common arming shaft.

14. An electrical switch device comprising a control module according to claim 12.

* * * * *